United States Patent Office 2,823,195
Patented Feb. 11, 1958

2,823,195

ORGANOSILICON POLYAMIDE COMPOSITIONS AND METHOD OF MAKING SAME

Leonard M. Shorr and Mary P. David, Pittsburgh, Pa., assignors to Dow Corning Corporation, Midland, Mich., a corporation of Michigan No Drawing. Application February 21, 1955
Serial No. 489,778

5 Claims. (Cl. 260—42)

This invention relates to silicone modified polyamides of the nylon type.

It has long been known that organosilicon compositions could be employed to modify organic resins and that they have been successfully incorporated in many type resins such as alkyds, epoxy resins, polyesters and vinylic resins. However, to date no commercially feasible method has been devised for incorporating organopolysiloxanes into nylon-type polyamides. This has been due to two reasons. One is the lack of satisfactory organosilicon intermediates for reacting with the polyamide-type resin and the other has been the unsatisfactory properties obtained by merely blending organosiloxanes wtih polyamides.

The present invention obviates these difficulties in that it pertains to a copolymer of polysiloxanes and polyamides in which the siloxane is actually tied to the amide chains through amide linkages. Because of this actual chemical combination the properties of the resulting products show substantial improvement over the polyamides alone.

It is the object of this invention to produce polyamides of the nylon type which have improved physical properties. Another object is to improve the adhesion of polyamide resins to glass and metal. Other objects and advantages will be apparent from the following description.

This invention relates to the condensation product of from .1 to 34% by weight of a siloxane of the formula

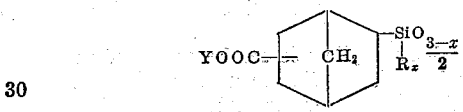

in which Y is alkyl or hydrogen, R is a monocyclic aryl hydrocarbon or a lower alkyl radical, $n$ has a value from 0 to 2 inclusive, R' is a monovalent hydrocarbon or halogenated monovalent hydrocarbon radical, $m$ has an average value from 1 to 3 inclusive and $a$ has a value from 0 to 5.66 inclusive and 66 to 99.1% by weight of a condensation product of an aliphatic diamine and an aliphatic dibasic acid.

The products of this invention are prepared in the conventional method for preparing polyamide resins, i. e., the silicone, the amine and the dibasic acid are heated together at temperatures above 100° C. with the removal of volatiles. In general, for the purpose of this invention it is immaterial what the order of addition of the reactants is, i. e., the siloxane carboxylic acid or siloxane ester may be first reacted with an excess of amine in order to give the corresponding amides having free amino groups and the resulting intermediate then reacted with the dibasic acid. Alternatively, the dibasic acid may be reacted with an excess of the diamine and subsequently the product reacted with the siloxane, or all three ingredients may be reacted simultaneously. In general, the relative proportions of the three reactants will be such that there is an approximately equivalent number of amino groups and carboxyl groups in the reaction mixture. Ideally the number of amino groups and carboxyl groups should be equal.

The siloxanes employed in the compositions of this invention may be materials in which each silicon atom has one of the carboxy endomethylene radicals attached thereto. These siloxanes may be of three classes, namely,

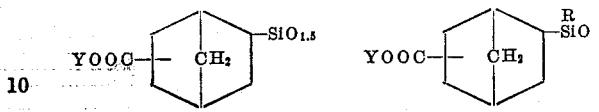

and

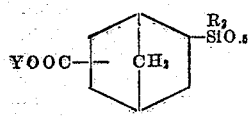

These siloxanes may be homopolymeric materials or copolymeric materials containing the various types of units. Also in the copolymers the various R radicals may be different. Specific examples of R groups which can be employed in the compositions of this invention are lower alkyl radicals such as methyl, ethyl, butyl, amyl or octyl and monocyclic aryl hydrocarbon radicals such as phenyl and tolyl. It can be seen that the above-defined siloxane units fall within the generic formula

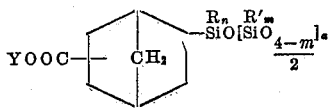

where Y and R are as above defined, and $x$ is an integer of from 0 to 2 inclusive.

In addition, the siloxanes employed in this invention may be copolymers of any one or any combination of the above-defined siloxane units with siloxane units of the formula $$R'_m SiO_{\frac{4-m}{2}}$$

in which R' and $m$ are as above defined. This type of siloxane may be present in amount up to 85 mol percent of the total siloxane employed in the composition. The second type of siloxane can be composed of units or any combination of units of the formula $R'SiO_{1.5}$, $R'_2SiO$ and $R'_3SiO_{.5}$ together with limited amounts of $SiO_2$ units. For the purpose of this invention R' can be any monovalent hydrocarbon radical such as alkyl radicals such as methyl, ethyl, propyl and octadecyl; alkenyl radicals such as vinyl, allyl and hexenyl; cycloaliphatic radicals such as cyclohexyl and cyclohexenyl; aryl hydrocarbon radicals such as phenyl, tolyl and xenyl and alkaryl hydrocarbon radicals such as benzyl and halogenated monovalent hydrocarbon radicals such as chlorophenyl, bromoxenyl, α,α,α-trifluorotolyl, trifluorovinyl, tetrafluoroethyl and chlorotrifluorocyclobutyl.

The siloxanes of this invention having the carboxy endomethylene radical attached to the silicon are prepared in accordance with the method described in the copending application of John L. Speier, Serial No. 463,062, filed October 18, 1954, now Patent No. 2,723,987, issued November 15, 1955. Briefly, this method comprises the reaction of the compounds

with hydrogen containing chlorosilanes such as trichlorosilane, methyldichlorosilane, etc., whereby the silane adds across the double bond. The resulting product is then hydrolyzed to give the siloxanes. These siloxanes may be copolymerized with hydrocarbon and halogenated hydrocarbon substituted siloxanes in the conventional manner.

ground into a powder and molded into test bars at a pressure of 2800 p. s. i. at 250° C. for 20 minutes. The properties of each sample are shown in the table below:

| Compositions in parts by weight | | | Rockwell Hardness R Scale | Flexural Strength, p. s. i. | Modulus of Elasticity | Percent Elongation in Flex |
|---|---|---|---|---|---|---|
| Siloxane | Hexamethylene diamine | Adipic Acid | | | | |
| Commercial nylon | | | 118 | 8,820 | 1.69×10⁵ | 1.8 |
| 1.9 | 9.5 | 10.95 | 111 | 17,200 | 2.78×10⁵ | 10.4 |
| 3.8 | 9.5 | 10.22 | 110 | >14,800 | 1.89×10⁵ | 14.0 |
| 7.6 | 9.5 | 8.76 | 118 | >7,210 | .2×10⁵ | 14.2 |

It is preferred, although not essential, that the siloxanes of this invention be completely condensed with respect to silanol hydroxyls prior to use in the compositions of this invention. This condensation is accomplished by refluxing the hydroxylated siloxane in solution with an alkyline catalyst until condensation is complete.

For the purpose of this invention improved results are obtained when the siloxane is employed in amount from .1 to 34% by weight of the total product. If the weight of the siloxane exceeds 34%, there is a sharp deterioration in the physical properties of the resulting product.

Any aliphatic diamine may be employed in this invention. This includes such materials such as ethylene diamine, hexamethylene diamine and octadecylene diamine. The preferred amines are those having 6 carbon atoms.

Any aliphatic dicarboxylic acid can be employed in the process of this invention. This includes such acids as malonic, succinic, adipic, suberic, sebacic, maleic and dimethylmaleic acids.

It is to be understood that a combination of 2 or more amines or 2 or more acids or 2 or more of the defined siloxanes can be employed in the compositions of this invention.

The products of this invention are useful in the preparation of polyamide laminates, molding compositions, and fibers. They are particularly useful in the preparation of polyamide glass laminates due to their superior adhesion to glass. The compositions of this invention are also useful in the making of molded articles due to their superior flexural strength.

The following examples are illustrative only and are not to be construed as limiting the invention which is properly delineated in the appended claims. The symbols "Me" and "Ph" are used throughout the specification to represent methyl and phenyl radicals respectively.

*Example 1*

The reactants employed in the various runs of this example were a siloxane of the formula

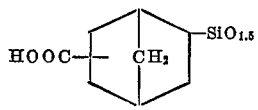

hexamethylene diamine and adipic acid. The reactants were employed in the proportion shown in the table below and each reaction was carried out in the following manner. The siloxane acid was dissolved in a 70% aqueous solution of hexamethylene diamine. The adipic acid was added and stirred until a homogeneous aqueous solution resulted. The solution was then heated to a temperature of 120–130° C. as nitrogen was passed through. After all the water had been removed, the essentially dry product was heated under nitrogen to a maximum temperature of 250° C. until evolution of water had ceased and the material was in the form of a fused hard polymer. The resulting product was then

*Example 2*

A resinous material was obtained by reacting 6.45 parts by weight of a copolymer having the composition 55 mol percent phenylmethylsiloxane, 15 mol percent monophenylsiloxane, 15 mol percent monomethylsiloxane and 15 mol percent of

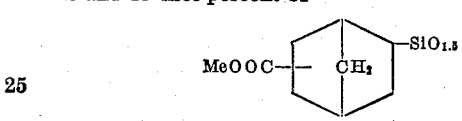

first with 9.86 parts by weight hexamethylene diamine and then with 12.4 parts by weight adipic acid following the procedure of Example 1. A moldable resin resulted.

*Example 3*

Equivalent results are obtained when 3.8 parts by weight of the siloxane

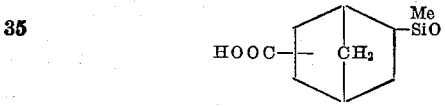

9.5 parts by weight hexamethylene diamine and 10.22 parts by weight adipic acid are reacted in accordance with the procedure of Example 1.

*Example 4*

Equivalent results are obtained when 6 parts by weight of a copolymer of 50 mol percent

5 mol percent vinylmethylsiloxane, 15 mol percent monophenylsiloxane, 15 mol percent monoamylsiloxane and 15 mol percent

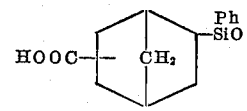

9 parts of hexamethylene diamine and 12.4 parts by weight of adipic acid are reacted in accordance with the procedure of Example 2.

That which is claimed is:

1. A composition of matter comprising an organosiloxane-polyamide copolymer which is the condensation product obtained from the reaction of an intimate mixture of from .1 to 34% by weight of a siloxane of the average general formula

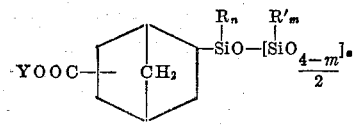

in which Y is selected from the group consisting of hydrogen and alkyl radicals, R is of the group consisting of monocyclic aryl hydrocarbon and lower alkyl radicals, $n$ has an average value from 1 to 2 inclusive, R' is of the group consisting of monovalent hydrocarbon and halogenated monovalent hydrocarbon radicals, $m$ has an average value from 1 to 3 inclusive and $a$ has a value from 0 to 5.66 inclusive, and from 66 to 99.1% by weight of the condensation product of an aliphatic diamine and an aliphatic dibasic acid containing only carbon, hydrogen and oxygen atoms.

2. An organosiloxane-polyamide copolymer which is the condensation product obtained from the reaction of an intimate mixture of from .1 to 34% by weight of a siloxane in which the polymeric units are of the formula

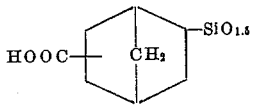

and from 66 to 99.1% by weight of the condensation product of hexamethylene diamine and adipic acid.

3. An organosiloxane-polyamide copolymer which is the condensation product obtained from the reaction of an intimate mixture of from .1 to 34% by weight of a siloxane in which the polymeric units are of the formula

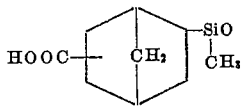

and from 66 to 99.1% by weight of a condensation product of hexamethylene diamine and adipic acid.

4. A composition comprising an organosiloxane-polyamide copolymer which is the condensation product obtained from the reaction of an intimate mixture of (1) a siloxane in which the polymeric units consist essentially of from 15 to 100 mol percent inclusive of units of the formula

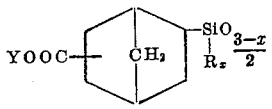

in which Y is selected from the group consisting of hydrogen and alkyl radicals, R is selected from the group consisting of monocyclic aryl hydrocarbon and lower alkyl radicals, and $x$ is an integer of from 0 to 2 inclusive; and from 0 to 85 mol percent inclusive of units of the formula

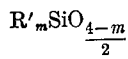

where R' is selected from the group consisting of monovalent hydrocarbon radicals and halogenated monovalent hydrocarbon radicals, and $m$ is an integer of from 1 to 3 inclusive, (2) an aliphatic diamine, and (3) an aliphatic dibasic acid containing only carbon, hydrogen and oxygen atoms; the proportions being such that prior to condensation there is from 0.1 to 34 percent by weight inclusive of (1).

5. A method for the preparation of organosilicon polyamide copolymers comprising reacting (1) a siloxane in which the polymeric units consist essentially of from 15 to 100 mol percent inclusive of units of the formula

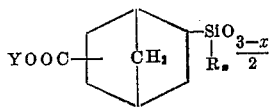

in which Y is selected from the group consisting of hydrogen and alkyl radicals, R is selected from the group consisting of monocyclic aryl hydrocarbon and lower alkyl radicals, and $x$ is an integer of from 0 to 2 inclusive; and from 0 to 85 mol percent inclusive of units of the formula

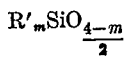

where R' is selected from the group consisting of monovalent hydrocarbon radicals and halogenated monovalent hydrocarbon radicals, and $m$ is an integer of from 1 to 3 inclusive, (2) an aliphatic diamine, and (3) an aliphatic dibasic acid containing only carbon, hydrogen and oxygen atoms, by heating an intimate mixture thereof at a temperature greater than 100° C. and in proportions such that there is an approximately equivalent number of amino groups and carboxyl groups in the reaction mixture.

References Cited in the file of this patent
UNITED STATES PATENTS 2,516,030   Swiss _____ July 18, 1950